Feb. 21, 1967  A. J. GIRARD  3,305,692
FOURIER TRANSFORM PHOTOELECTRIC OBJECT ANALYZER
Filed July 15, 1963  14 Sheets-Sheet 1
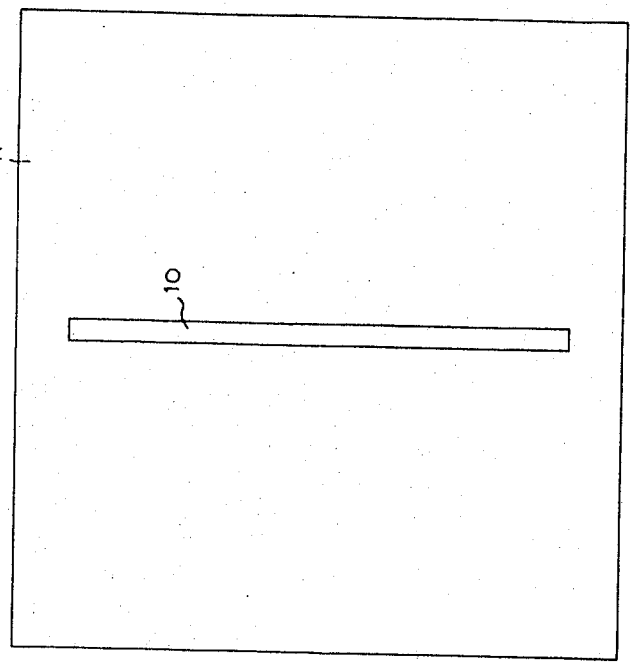
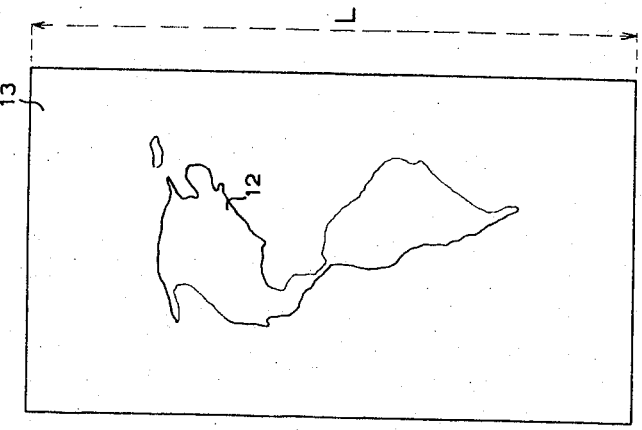
INVENTOR
ANDRE' J. GIRARD
BY
Abraham A. Saffitz
ATTORNEY Feb. 21, 1967  A. J. GIRARD  3,305,692
FOURIER TRANSFORM PHOTOELECTRIC OBJECT ANALYZER
Filed July 15, 1963  14 Sheets-Sheet 2
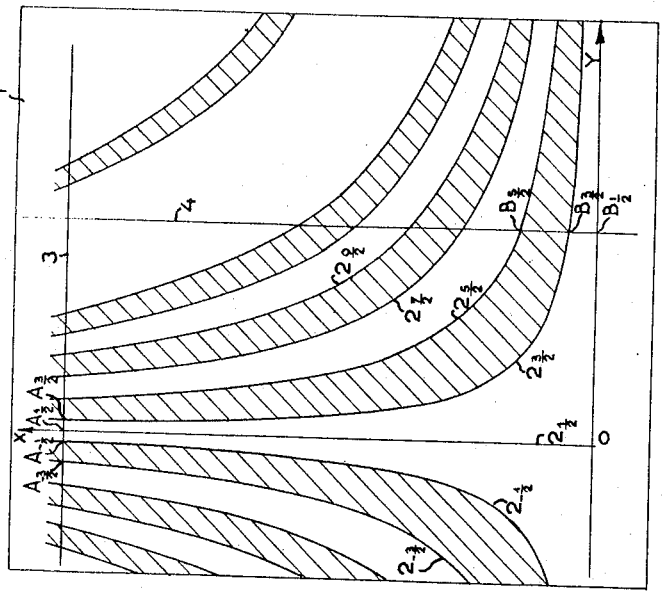
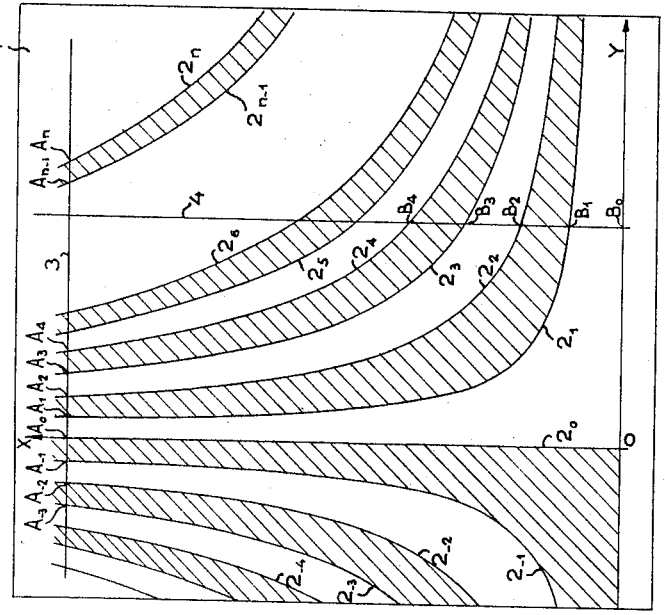
INVENTOR
ANDRÉ J. GIRARD
BY
Abraham A. Saffitz
ATTORNEY Feb. 21, 1967     A. J. GIRARD     3,305,692
FOURIER TRANSFORM PHOTOELECTRIC OBJECT ANALYZER
Filed July 15, 1963     14 Sheets-Sheet 3

INVENTOR
ANDRÉ J. GIRARD
BY
Abraham A. Saffitz
ATTORNEY

Feb. 21, 1967 A. J. GIRARD 3,305,692
FOURIER TRANSFORM PHOTOELECTRIC OBJECT ANALYZER
Filed July 15, 1963 14 Sheets-Sheet 4

INVENTOR
ANDRÉ J. GIRARD
BY
Abraham A. Saffitz
ATTORNEY

Feb. 21, 1967 A. J. GIRARD 3,305,692
FOURIER TRANSFORM PHOTOELECTRIC OBJECT ANALYZER
Filed July 15, 1963 14 Sheets-Sheet 5

INVENTOR
ANDRÉ J GIRARD
Abraham A. Saffitz
ATTORNEY

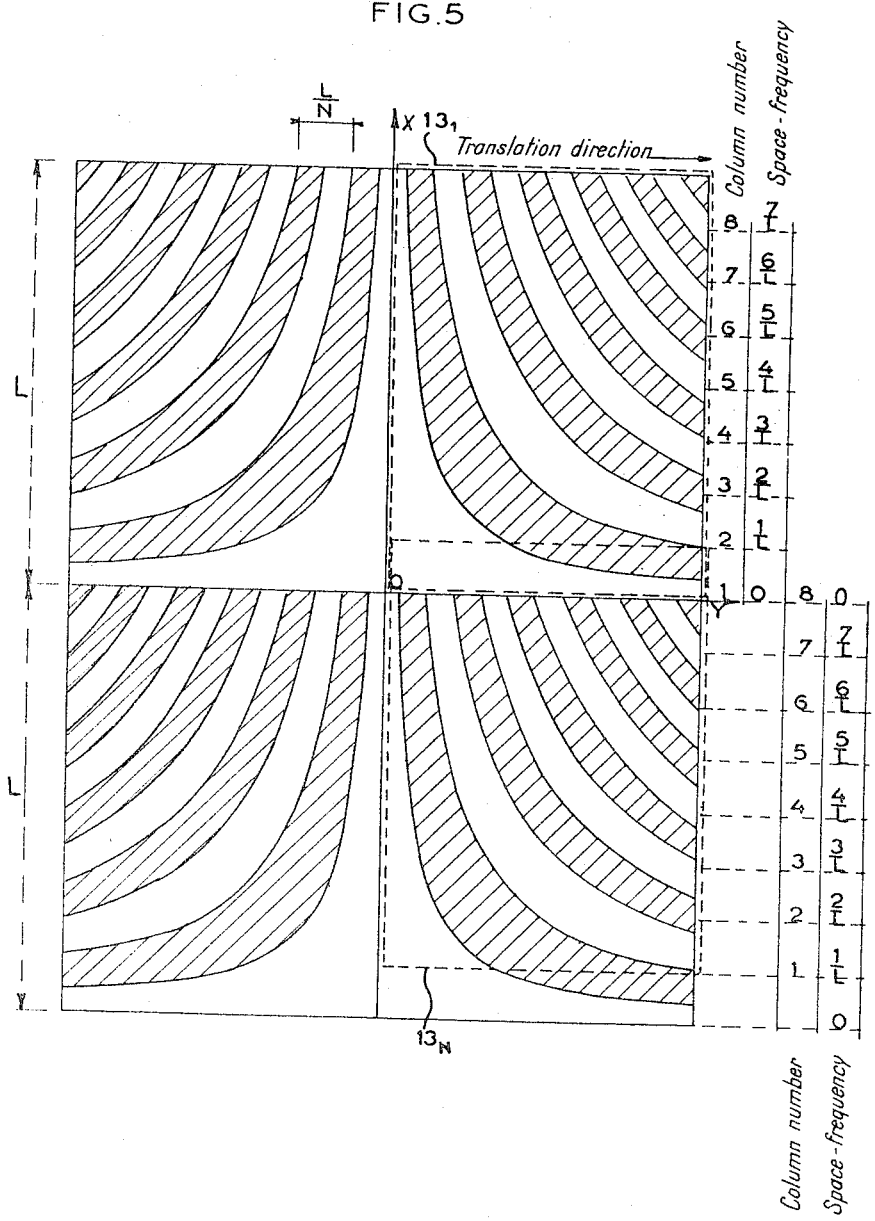

Feb. 21, 1967    A. J. GIRARD    3,305,692
FOURIER TRANSFORM PHOTOELECTRIC OBJECT ANALYZER
Filed July 15, 1963    14 Sheets-Sheet 9

INVENTOR
ANDRÉ J. GIRARD
BY
Abraham A. Saffitz
ATTORNEY

Feb. 21, 1967 A. J. GIRARD 3,305,692
FOURIER TRANSFORM PHOTOELECTRIC OBJECT ANALYZER
Filed July 15, 1963 14 Sheets-Sheet 10

INVENTOR
ANDRÉ J. GIRARD
BY
Abraham A. Saffitz
ATTORNEY

Feb. 21, 1967 A. J. GIRARD 3,305,692
FOURIER TRANSFORM PHOTOELECTRIC OBJECT ANALYZER
Filed July 15, 1963 14 Sheets-Sheet 13
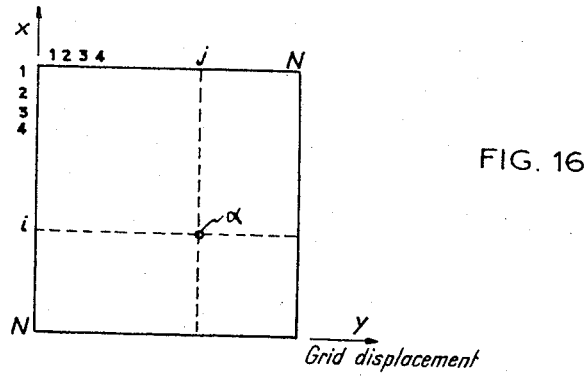
FIG. 16
FIG. 17
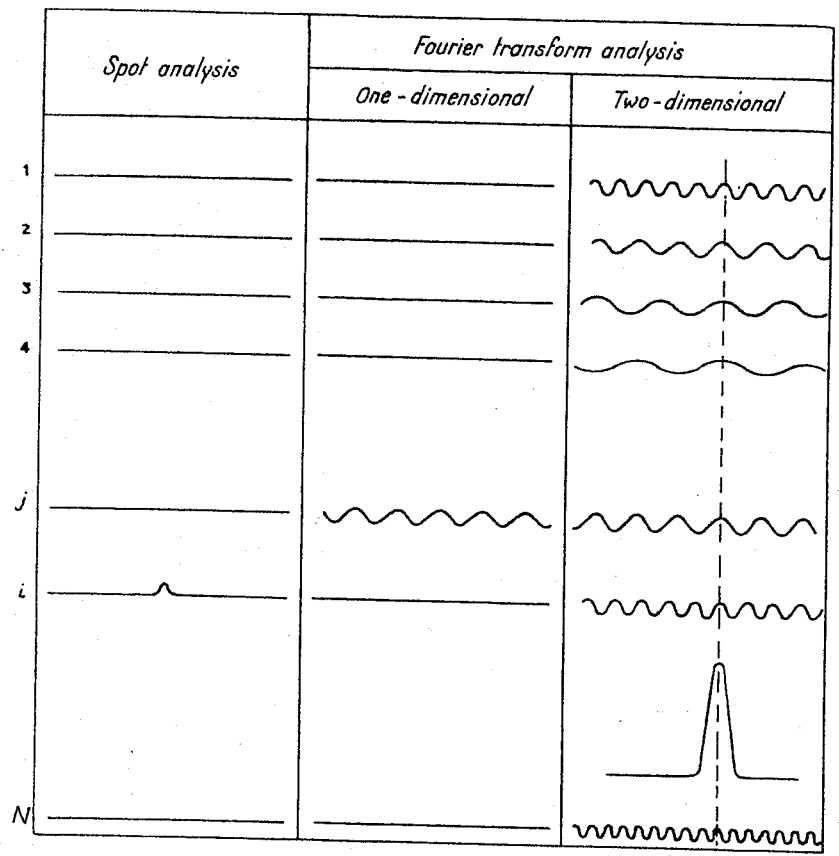
INVENTOR
ANDRÉ J. GIRARD
BY
Abraham A. Saffitz
ATTORNEY

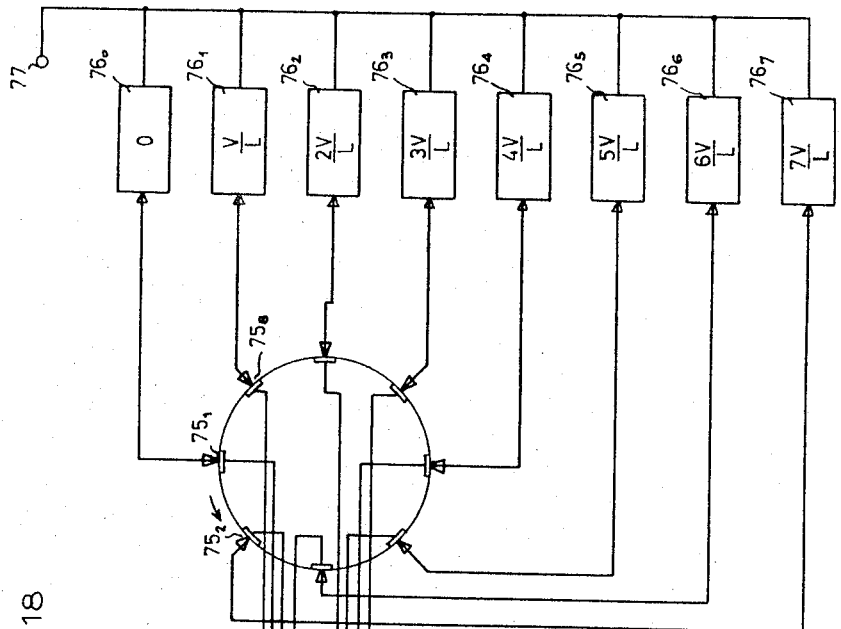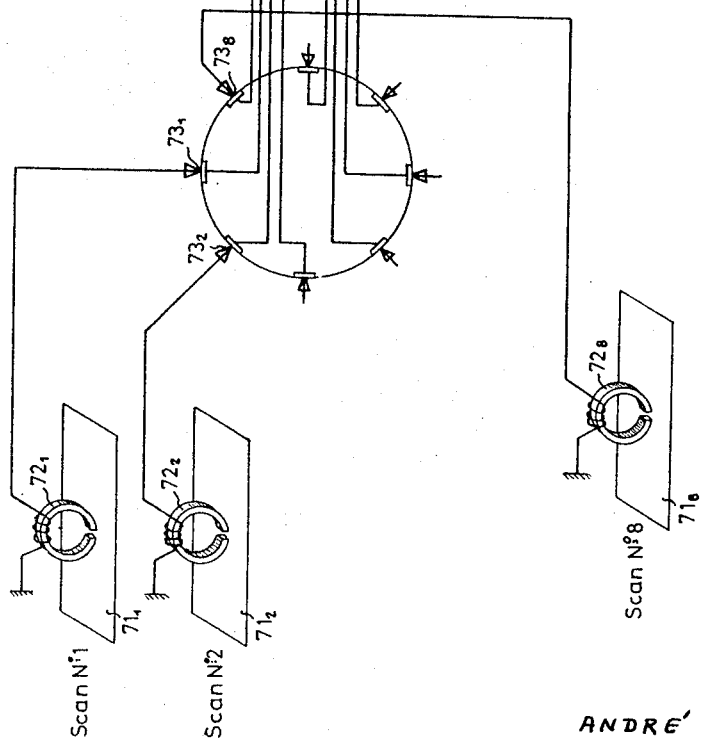
FIG. 18

3,305,692
FOURIER TRANSFORM PHOTOELECTRIC OBJECT ANALYZER

André J. Girard, Chatillon-sous-Bagneux, France, assignor to the Office National d'Etudes et de Recherches Aerospatiales, Chatillon-sous-Bagneux, a corporation of France
Filed July 15, 1963, Ser. No. 295,024
Claims priority, application France, July 18, 1962, 904,402
8 Claims. (Cl. 250—237)

This invention relates to methods and means for the optical analysis of plane objects, where the whole area of said objects is scanned for the luminance or transparency of its various points. More specifically, the invention relates to means for effecting said scanning in such a way as to derive, in the form of time functions, Fourier transforms of point functions representing the variations of such luminance or transparency along suitably chosen coordinates in the plane of said objects, which, in a general manner, will be assumed to have a rectangular shape. The ultimate purpose of the method and means of the invention is, as usual, to have such time functions as result from said analysis recorded on a convenient storage medium (for instance, a motion picture film or a magnetic tape), in view of later restituting images of said objects by imparting said medium a suitable motion, preferably a constant velocity one, and by operating from the moving record a corresponding restitution apparatus. Recording is achieved by causing the variable intensity light flux from the scanning apparatus to act upon photosensitive means, which in turn deliver signals capable of being impressed upon said storage medium.

In the invention, like in many known systems, scanning is effected by optically dividing the object into a number of narrow parallel strips. However, contrarily to what is done in some of these known systems, scanning is not effected according to a point-by-point procedure along each one of said strips. The overall scanning operation is divided into a number of partial scannings, at least equal to that of said strips and in each one of which one or several of said strips are scanned. Such partial scanning is effected by imparting a continuous sweeping motion to a "pattern plate" or "grid" arranged in front of the object and in a plane parallel thereto. This plate (or grid) is so designed that its transparency varies from point to point according to a predetermined arrangement, which has to be selected in a manner depending on the nature of the sweeping motion and its kinematic dependence upon time. More precisely, this arrangement consists of alternate transparent and opaque regions delineated by curves chosen according to said nature and time dependence of said motion. Light from that part of the object which is swept at each partial scanning is partly intercepted and partly let through by said pattern plate, wherefrom intensity modulation of the corresponding light flux results as the sweeping motion progresses. The modulated light flux is collected by suitable optical means and made to fall onto photosensitive means, as already mentioned.

In a first embodiment of the invention, in which the strips are rectilinear, one single strip being scanned at each partial scanning, and in which the strips are perpendicular to the direction of the sweeping motion (in which case it will be said that the strips are lying along the lines of the object), each scanned strip is sequentially isolated by means of a mask provided with a narrow adjustable slit; in this case Fourier transforms of the luminance or transparency point function along the lines of the object are directly built up and sequentially stored. In this case, the scanning motion is a rectilinear translation one, preferably with a constant velocity.

In a second embodiment of the invention, in which the scanning motion still is a rectilinear translation motion, and in which the strips are rectilinear and parallel to the direction of the sweeping or scanning movement (in which case it will be said that the strips are lying along the columns of the object), several or even all of said strips are scanned at each partial scanning; said strips are no longer sequentially isolated by means of a shifting slit. Between each partial scanning and the next one, the pattern grid is shifted sidewards, i.e. in a direction perpendicular to that of the sweep, and this by a quantity equal to the width of one strip. In that way, there is obtained, at each partial scanning, the sum of a number of Fourier coefficients each pertaining to the luminance (or transparency) function relating to a different strip, and also to a component having a different spatial frequency for each such strip, any such coefficient for a given strip depending upon the relative "phase," i.e. relative location of the pattern plate with respect to the object at the beginning of each partial scanning, said phase, measured along the direction perpendicular to that of the sweeping motion, being given a different value at each successive partial scanning. After a number of partial scannings equal to the total number of strips in the object, there are obtained as many different sums of Fourier coefficients as are necessary to calculate, theoretically, every one of such coefficients, as will be shown later on.

An advantage of the system of the present invention is to provide means for analyzing by continuous Fourier analysis, that is Fourier integration, luminous objects the luminance of which is very weak.

A further object of the invention is to provide means for analyzing non-storable or uneasily-storable images, formed on image media or supports by visible or invisible radiation rays, particularly by infra-red rays. Such images are not adapted to be stored on conventional photographic film compositions, photocathodes, mosaic electrodes, etc., but can only operate radiation detectors the noise factor of which is substantially constant and does not depend upon the received radiation flux. These radiation, particularly infra-red, images can be advantageously submitted to Fourier analysis since, as will be explained later, the said analysis improves the signal-to-noise ratio.

The term image as used above is synonymous with object and denotes a plane object either self-luminous (electroluminescent image panel, for example) or reflection-illuminated or transparency-illuminated objects.

In a first embodiment of the invention, the luminous or transparent object analyzer device comprises a support for a plane object to be analyzed, a mask provided with a rectilinear slit allowing rays from a line of the object to be projected therethrough, said slit being adapted to move step by step according to a parallel translation motion in a given direction substantially perpendicular to the length of said slit, for sequentially unmasking the object lines, a variable transparency pattern grid including contiguous transparent and opaque regions, said regions being delineated by curves equally spaced apart along straight lines parallel to the slit, the spacing between the curves measured along any one of said straight lines preferably varying inversely proportionally to the distance of the considered one of said straight lines from an origin point, means for continuously moving said pattern grid with respect to the object-support along the said given direction, and photosensitive means for collecting the rays issued from the object through the pattern plate and slit for each position of the slit.

In a second embodiment, the analyzer device comprises a plane support for the objects to be analyzed, a pattern grid including contiguous transparent and opaque regions, the said regions being delineated by curves equally spaced apart along straight lines parallel to a given direction, the spacing between the curves along said straight lines preferably varying inversely proportionally to the distance of these straight lines from an origin point, first means for continuously moving the pattern grid with respect to the object-support along said given direction, second means for stepwise shifting the pattern grid with respect to the object-support along a direction perpendicular to said given direction, each stepped shift succeeding one continuous motion, and photosensitive means for collecting the rays issued from the object through the pattern plate during each continuous motion of the pattern plate.

These features and others, together with advantages of the present invention will become more apparent upon a perusal of the following specification taken in connection with the accompanying drawings, wherein:

FIGS. 1a, 1b, 1c and 1d respectively show the object-support, the mask with the narrow slit in it, and the rectilinearly movable pattern grid;

FIG. 2 diagrammatically represents a line-by-line or unidimensional scanning object analyzer according to the invention;

FIGS. 3a, 3b and 3c represent with further details the analyzer shown in FIG. 2, the stepwise shifting means for the mask and the continuous motion means for the pattern grid with respect to the object support;

FIG. 4 schematically represents another object analyzer proceeding by line-by-line or unidimensional scanning;

FIG. 5 represents the pattern grid of an object analyzer proceeding by dimensional scanning;

Figure 7:
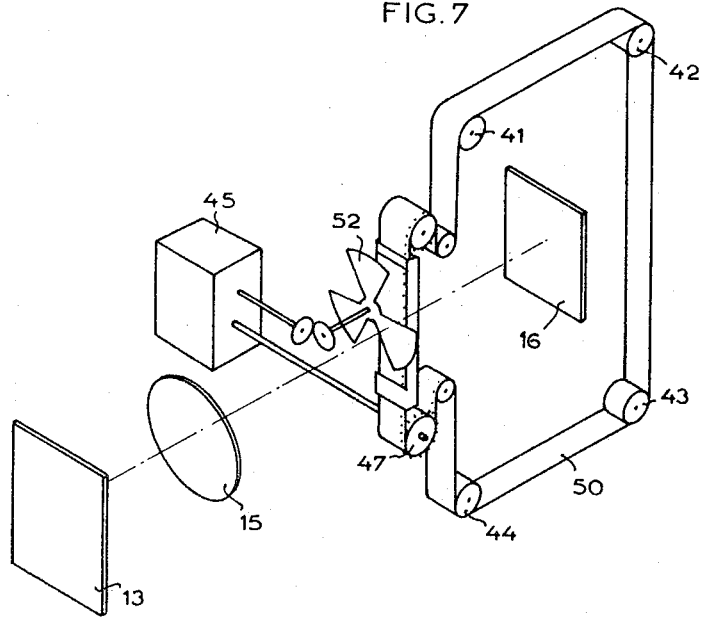
Figure 8:
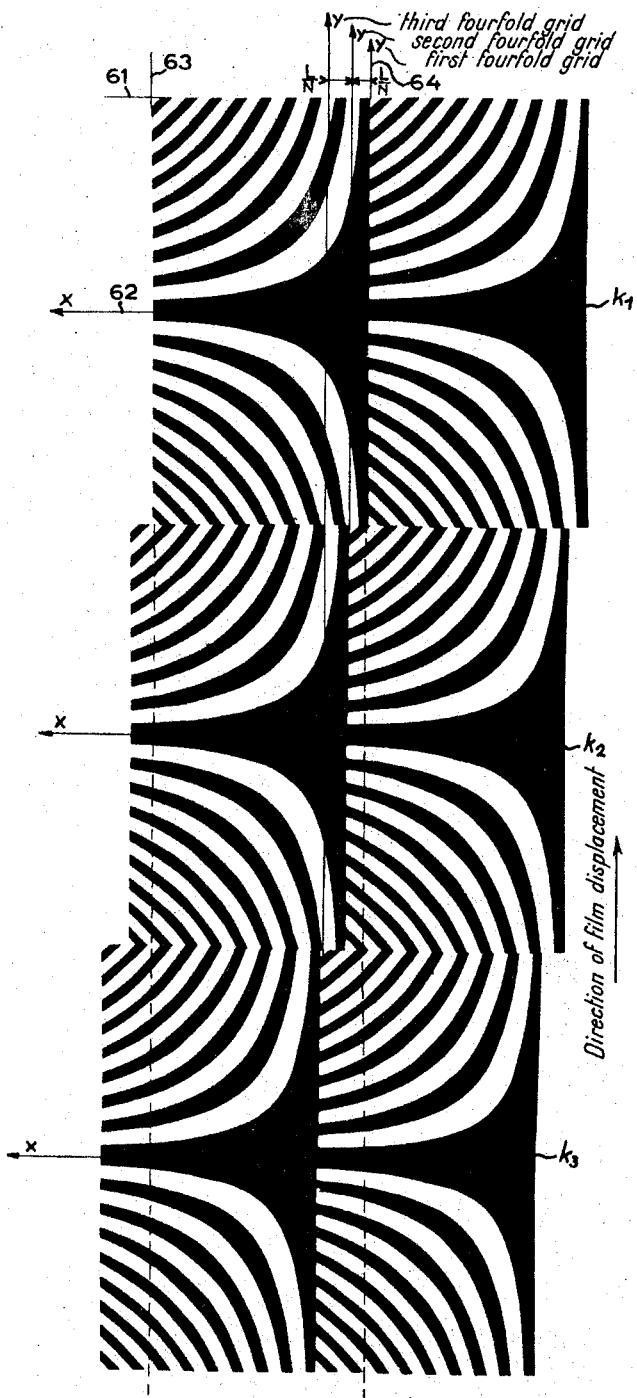
Figure 14:
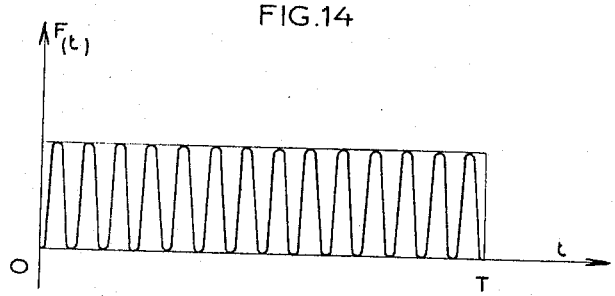
Figure 15:
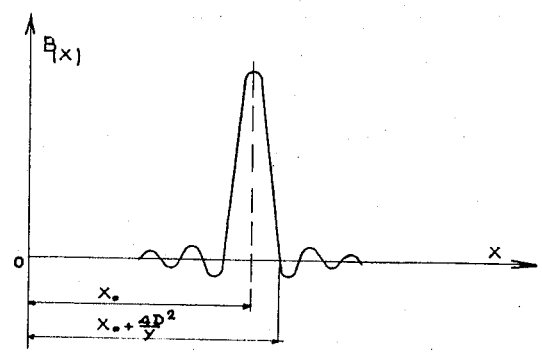
Figure 9:
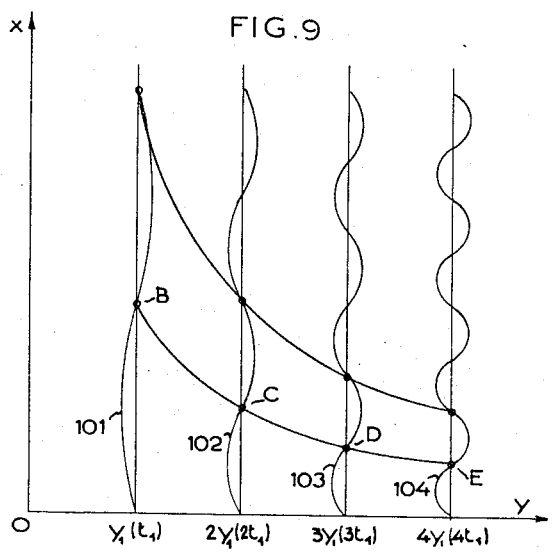
Figure 10:
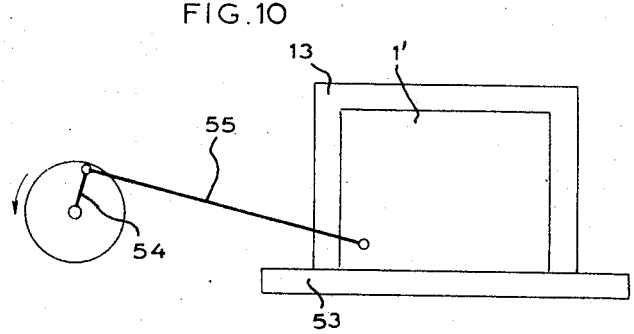
Figure 13:
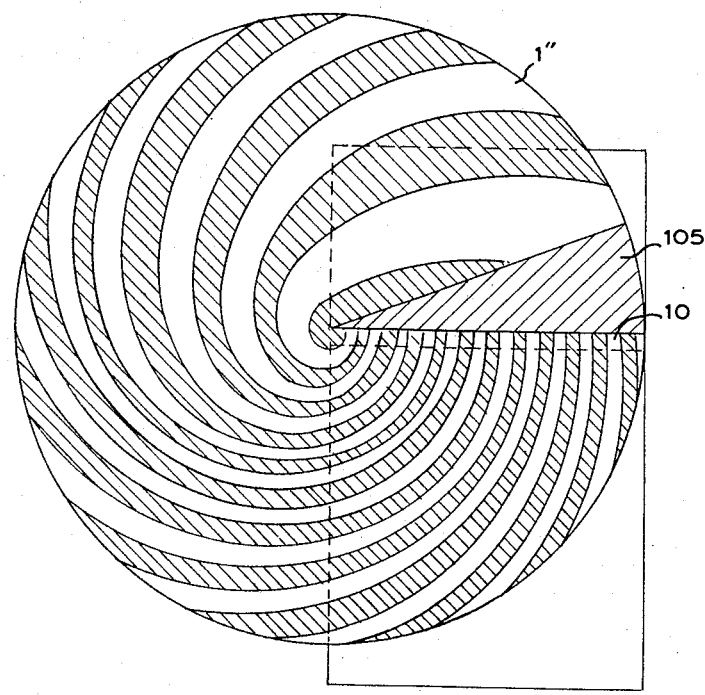
Figure 11:
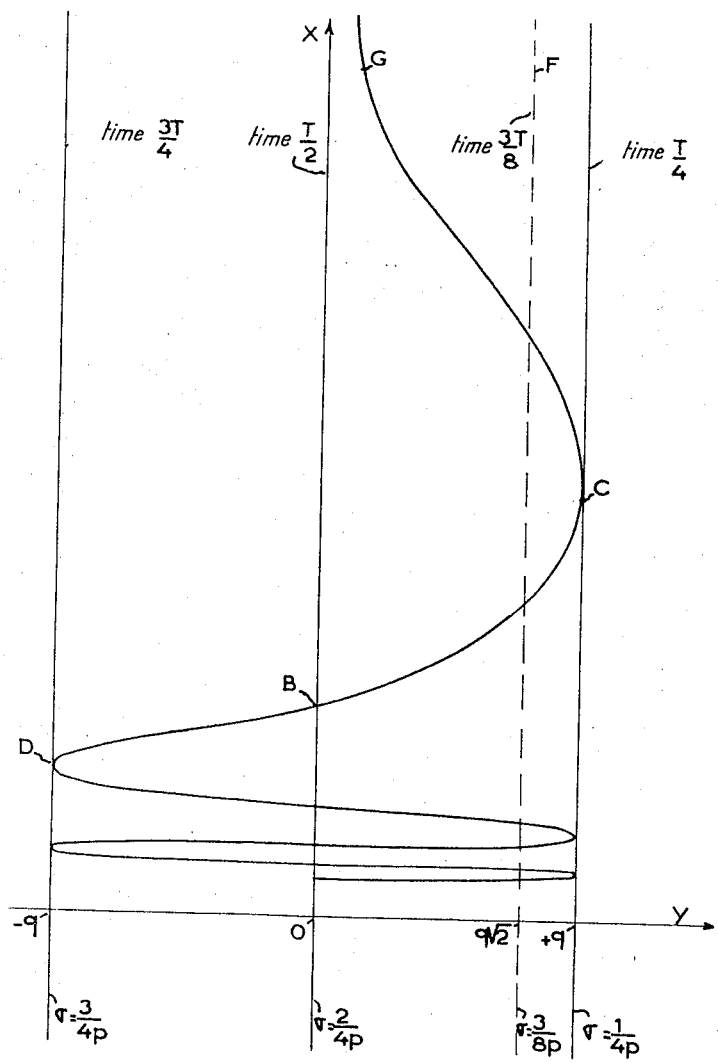
Figure 12:
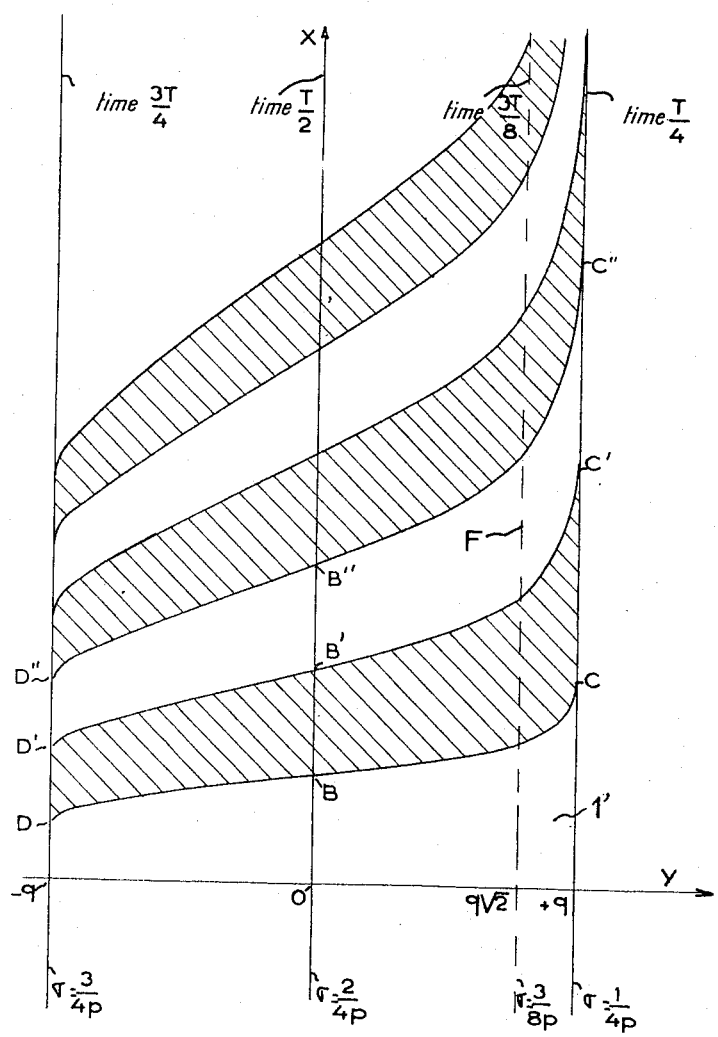

FIG. 7 schematically represents an object analyzer proceeding by bidimensional scanning;

FIG. 8 represents a multiple pattern grid film cooperating with the object analyzer proceeding by bidimensional scanning of FIG. 7;

FIG. 9 shows a diagram useful for physically explaining the continuous Fourier analysis resulting from the movement of the grids shown in FIGS. 1c, 1d and 5;

FIG. 10 shows a pattern grid having a sinusoidal rectilinear movement with respect to the object support;

FIG. 11 represents the shape of the curve limiting the transparent and opaque regions of the pattern grid used in the analyzer of FIG. 10;

FIG. 12 represents the pattern grid used in the analyzer of FIG. 10;

FIG. 13 represents a pattern grid usable when the pattern grid is imparted a constant velocity rotation motion;

FIGS. 14 and 15 are diagrams useful for explaining the calculation of the resolving power of the object analyzers according to the invention;

FIGS. 16 and 17 are diagrams useful for explaining the improvement of the signal-to-noise ratio, on the one hand in the case where scanning is achieved by a point-to-point procedure, and on the other hand in the case where scanning is achieved by a unidimensional or two-dimensional Fourier analysis; and FIG. 18 represents a filter and switch circuit for synthetizing the Fourier transforms corresponding to each column of the object from the signal components corresponding to groups of such columns when the second embodiment of the invention is used.

In the following, a line of the object will denote a straight line perpendicular to the continuous motion direction of the pattern grid in front of the object and a column of the object will denote a straight line parallel to the latter direction of the pattern grid regardless of whether this direction is horizontal or vertical. The curves of the pattern grid are plotted with respect to two rectangular coordinate axes, the x-axis being parallel to the object lines and the y-axis parallel to the continuous motion direction of the pattern grid, i.e., to the object columns.

Referring first to FIGS. 1a, 1b, 1c and 1d, there will be shown that the signal derived by superimposing the slit 10 of mask 11 of FIG. 1b on a line of the object 12 registered on plate 13 (a plate of frosted glass for example) of FIG. 1a, by moving the pattern grid of FIG. 1c in front of the slit and perpendicularly to the direction thereof with a uniform velocity and by collecting on a light sensitive device the light from the object, is precisely the Fourier transform of the luminance function or of the transparency function of the object line.

The pattern grid of FIG. 1c comprises a transparent plate 1 on which there is drawn a family of equilateral hyperbolae $2_1$ to $2_n$ and $2_{-1}$ to $2_{-p}$ with respect to two rectangular coordinate axes $Ox$ and $Oy$ coincident with the asymptotes thereof. The equation of the hyperbolae of the family with respect to an integral parameter $n$ and to a suitably chosen unit length D is:

$$xy = 2nD^2 \quad (1)$$

If the hyperbolae of the family are cut by a straight line 3 of abscissa $x$, there is obtained a plurality of intersection points $A_1$ to $A_n$ the ordinates of which are given by:

$$y_n = 2nD^2/x$$

If further $A_0$ denotes the intersection point of the straight line 3 and the x-axis (which corresponds to the hyperbola of the family for which parameter $n=0$), there is seen that the segments $A_1, A_0, \ldots A_n, A_{n-1}$ are equal to each other. The common length $2D^2/x$ of the segments $A_n, A_{n-1}$ is inversely proportional to the distance $x$ of the straight line 3 from asymptote $Oy$. As Equation 1 is symmetrical with respect to $x$ and $y$, the hyperbolae also cut into equal segments any straight line 4 of ordinate $y$ and the segments $B_1, B_0, B_2, B_1, \ldots B_n, B_{n-1}$ are all equal ones, $B_0$ being the intersection point of the straight line 4 and the y-axis.

Theoretically pattern grid 1 would have a transparency represented by a sine law with respect to abscissa and ordinate, that is to say, along straight line 3 of abscissa $x$, the transparency function would have to be:

$$2\gamma = 1 + \sin \frac{\pi x}{2D^2} y \quad (2)$$

and along straight line 4 of ordinate $y$ it would have to be:

$$2\gamma = 1 + \sin \frac{\pi y}{2D^2} x$$

so that the curves of equal transparency be equilateral hyperbola.

In fact, since it is unpractical to build up a pattern grid having a transparency continuously variable according to a given law, it is preferable and sufficient for all practical purposes to start from a transparent plate, to leave the regions between a first and a second contiguous hyperbola unchanged and to blacken the regions between a second and a third contiguous hyperbola and so on. The pattern grid thus comprises alternate transparent and opaque regions bounded by hyperbolic curves, the constant spacing between two adjacent curves taken along a straight line parallel to one asymptote varying inversely proportionally to the distance of said straight line from said asymptote.

In the case that has just been described, the arrangement of the grid pattern is antisymmetrical with respect to the coordinate axes. It is also possible to use a pattern grid (FIG. 1d) the arrangement of which is symmetrical with respect to the coordinate axes. Equations 1 and 2 are then respectively replaced by Equations 1' and 2" below:

$$xy = (2n-1)D^2 \quad (1')$$

$$2\gamma = 1 + \cos\frac{\pi x}{2D^2}y \qquad (2')$$

The spatial frequency of the transparency $\gamma$ along straight line 3 of abscissa $x$ is:

$$\sigma(x) = x/4D^2$$

The pattern grid is thus entirely defined if the spatial period $4D^2/x_0$ along a straight line of given abscissa $x_0$ is also given.

Now, it will be assumed that object 12, mask 11 and pattern grid 1 of FIGS. 1a and 1b are superimposed, the slit 10 of the mask falling in with asymptote $Ox$ of FIGS. 1c and 1d of the grid and allowing the light from a line of the object to pass therethrough. Moreover, it will be assumed that the pattern grid moves for a time $t$ in a parallel direction to the $Oy$-axis with a uniform velocity $v$, or in other words, that is $y=vt$. Then, Equation 2 becomes:

$$2\gamma = 1 + \sin \pi vxt/2D^2 \qquad (3)$$

which shows that $2\gamma$ is a time-function of frequency:

$$\nu(x) = vx/4D^2 \qquad (4)$$

Along the slit, the luminance or the transparency of the object can be represented by a function $B(x)$ or $$B\left(\frac{4D^2}{v}\nu\right)$$

since $$x = \frac{4D^2}{v}\nu$$

During the grid movement, the light rays issued from the various points of the line of the object to be analyzed are modulated at various frequencies lying in a continuous frequency spectrum. If the transmitted light is concentrated on a light detector 16, an electron multiplier vacuum photocell for example, the output signal of the detector has for its expression, except for a constant coefficient:

$$F(t) = \int_{\nu_1}^{\nu_2} B\left(\frac{4D^2\nu}{v}\right) \cos 2\pi\nu t\, d\nu \qquad (5)$$

where $\nu_1$ and $\nu_2$ are time-frequencies respectively corresponding to the abscissae:

$$x_1 = \frac{4D^2}{v}\nu_1 \qquad x_2 = \frac{4D^2}{v}\nu_2$$

which are the abscissae for the ends of slit 10 of FIG. 1b (smaller sides of the slit). There is seen from Equation 5 that the signal received by detector 16 is the Fourier transform of the luminance function or transparency point function for a line of the object. The object is assumed to be an "amplitude" object; its luminance or transparency function is a real positive function; the Fourier transform of its odd (sine) portion is given by Equation 5 and the Fourier transform of its even (cosine) portion would be obtained by so shifting the grid as to substitute the pattern of FIG. 1d for that of FIG. 1c; this can be done by providing said grid with both patterns and making the shift equal to the whole length of one pattern.

The pattern grid is rectangle-shaped and the sides of the rectangle are parallel to the asymptotes of the hyperbolae. If Y is the length of the rectangle in the direction parallel to $Oy$, the signal is received by the light detector between the instants zero and $T = Y/v$.

The resolving power, i.e. the minimal distance between two points the device is able to distinguish, can be computed in the following manner. The function $F(t)$ being stored in a convenient medium, the luminance or transparency function is related to the latter function by the formula:

$$B(x) = B\left(\frac{4D^2\nu}{v}\right) = \int_0^T F(t) \cos 2\pi\nu t\, dt$$

A point of the object of abscissa $x_0$ gives rise to a sine wave of frequency $\nu(x_0)$ between the instants zero and T (FIG. 14). The Fourier transform of such a transient sine function is:

$$B(x) = B\left(\frac{4D^2\nu}{v}\right) = \beta T\frac{\sin \pi[\nu(x) - \nu(x_0)]T}{\pi[\nu(x) - \nu(x_0)]T} =$$

$$\beta T\frac{\sin \frac{\pi v}{4D^2}(x-x_0)T}{\frac{\pi v}{4D^2}(x-x_0)T}$$

($\beta$, constant).

FIG. 15 shows that $B(x)$ has secondary maxima and a first zero at $x_0 + 4D^2/vT = x_0 + 4D^2/Y$. Thus the resolving power may be taken equal to $4D^2/Y$.

For example, a typical grid is as follows:

$$D = 1.5 \text{ mm.}$$

Minimal pitch of the grid at abscissa $x_1$:

$$2D^2/x_1 = 0.1 \text{ mm.}$$

Maximal pitch of the grid at abscissa $x_2$:

$$2D^2/x_2 = 0.3 \text{ mm.}$$

Height of the grid:

$$x_1 - x_2 = 30 \text{ mm.}$$

Continuous motion velocity:

$$v = 20 \text{ mm. sec.}^{-1} \text{ (wherefrom } T = 1.5 \text{ sec.)}$$

Width of the grid:

$$Y = 30 \text{ mm.}$$

Resolving power:

$$4D^2/Y = 4 \times 1.5^2/30 = 0.3 \text{ mm.}$$

The analyzer device thus allows a resolution of 100 points per line.

As already said, the analyzer device of the invention not only permits a line-by-line object analysis by sequentially unmasking the lines through the slit, but it also permits a two-dimensional analysis without slit. In the case where the device comprises a slit mask, the starting point of the pattern grid movement is that one in which the slit and the asymptote $Ox$ are coincident. In the case where there is no slit, the starting point of the continuous translation motion is no longer a step-by-step changing point but is an unchanging starting point, for example that at which the asymptote $Ox$ of FIG. 5 falls in with the left vertical edge of the object, between each any two successive continuous translation motions of the pattern grid, the same is displaced one step in the $x$-axis direction, that is to say in the direction perpendicular to the continuous movement of the grid. The general scanning is thus a two-dimensional one and comprises a series of successive one-dimensional continuous scanning movements along the $y$-axis separated by step-by-step shifts along the $x$-axis.

The two-dimensional luminance or transparency function of the object 12, $B(xy)$, may be considered to be the sum of N one-dimensional functions of $y$:

$$B(xy) = b_1(y) + b_2(y) + \ldots + b_i(y) + \ldots + b_N(y)$$

each of said functions representing the distribution of the light intensity along one of the N columns of the object.

The object carrier plate 13 of FIG. 1a is assumed to be rectangular or square and its side perpendicular to the continuous translation direction has a length L. To this plate is superimposed the pattern grid defined by Equation 2' and shown in FIG. 5. The length of the shift of the grid between two successive continuous motions of the same is taken equal to $L/N$ since information from N columns of the object must be obtained or, in other words, all the information must be derived from N continuous scans of the object. This shift is taken equal to the pitch of the grid pattern along the line $x=L$, i.e. to $4D^2/L$, which gives:

$$D^2 = L^2/4N$$

Equation 2' becomes:

$$\gamma(xy) = \tfrac{1}{2}[1 + \cos 2\pi Nxy/L^2] \qquad (6)$$

The pattern grid shown in FIG. 5 has an area $4L^2$ and comprises two rectangular grids each having an area $4L^2$, identical and having a common side parallel to $Oy$.

The grid of FIG. 5 is given a reciprocating translation motion N times in front of the object in the direction $Oy$ and each time with the same velocity. The amplitude of the movement is L and the starting position is, as already said, the position in which the $x$-axis of the grid and the left vertical side of the object coincide. The object is constantly and entirely covered by the pattern grid during the reciprocations. Between two successive reciprocations, the grid is shifted one step $L/N$ along the $x$-axis. During the first scan, the object ($13_1$ in FIG. 5) coincides with the right upper quarter of the pattern grid and during the $N^{th}$ scan, the object ($13_N$ in FIG. 5) coincides with the position indicated in dotted line in FIG. 5. It has been assumed in FIG. 5 that the columns were eight in number, numbered from 1 to 8, and, at the right vertical side of the grid, the numerals of the columns have been written together with the corresponding space frequencies. It is apparent from the indications in FIG. 5 that during the first scan, column No. 1 is scanned at space-frequency zero, column No. 2 at space-frequency $1/L$ and column No. 8 at space-frequency $7/L$ whereas during the eighth scan, column No. 1 is scanned at space-frequency $1/L$, column No. 2 at space frequency $2/L$ and column No. 8 at space-frequency 0. A given column, No. 5 for example, is scanned during the eight successive scans at space-frequencies $4/L$, $3/L$, $2/L$, $1/L$, 0, $7/L$, $6/L$, $5/L$.

If one denotes by $m$ the number of the ($1 < m < N$) scan and by $i$ the number of the column of the object ($1 < i < N$), the output signal during the $m^{th}$ scan is a function $F_m(y)$ defined in the interval 0, L. This function is the sum of N components respectively representing the contributions of the N columns of the objects:

$$F_m(y) = \sum_{i=1}^{i=N} f_{m,i}(y) \qquad (7)$$

The contribution arising from the $i^{th}$ column is: for $i > m$ $$f_{m,i}(y) = \int_0^L b_i(y_0) \cos \frac{2\pi N}{L^2}\left(\frac{mL}{N} - \frac{iL}{N}\right)(y - y_0) dy_0$$

$$= \int_0^L b_i(y_0) \cos \frac{2\pi}{L}(m-i)(y-y_0) dy_0$$

for $i < m$ $$f_{m,i}(y) = \int_0^L b_i(y_0) \cos \frac{2\pi}{L}[N + (i-m)](y - y_0) dy_0$$

If we set:

$$a_{m,i} = \begin{cases} \dfrac{m-i}{L} & \text{for } i > m \\ \dfrac{N+(i-m)}{L} & \text{for } i < m \end{cases}$$

it results:

$$f_{m,i}(y) = \int_0^L b_i(y_0) \cos 2\pi a_{m,i}(y - y_0) dy_0 \qquad (8)$$

The output signal of the photosensitive detector at each scan is represented by function (7) where $f_{m,i}(y)$ has the value given by Equation 8.

A signal (7) is obtained and stored at each scan and from the stored signals it is possible (i) to build up the function $F(t)$ given by Equation 5 for each line (here for each column) and (ii) to restore the luminance or transparency function $B(xy)$ of the object.

These restorations can be achieved in the following manner: $f_{m,i}(y)$ is a sine function having constant frequency and amplitude during a given scan, here the scan of order $m$, since the development of Equation 8 gives:

$$f_{m,i}(y) = \cos 2\pi a_{m,i} y \int_0^L b_i(y_0) \cos 2\pi a_{m,i} y_0 dy_0$$

$$+ \sin 2\pi a_{m,i} y \int_0^L b_i(y_0) \sin 2\pi a_{m,i} y_0 dy_0 \qquad (9)$$

The frequency does not depend upon the object to be analyzed: it depends only upon the pattern of the grid and the respective position of the object and the pattern grid at the beginning of the scan. Let us respectively denote by $A_{m,i}$ and $B_{m,i}$ the first and second integrals in Formula (9); the amplitude:

$$C_{m,i} = \sqrt{A_{m,i}^2 + B_{m,i}^2}$$

and the phase $$\tan \phi_{m,i} = -B_{m,i}/A_{m,i}$$

of $f_{m,i}(y)$ depend upon $b_i(y)$.

The total signal $F_m(y)$ is therefore the sum of N sine signals of N various frequencies $a_{m,1}, a_{m,2}, \ldots a_{m,i}, \ldots a_{m,N}$. These signals can be separated by a Fourier analysis of $F_m(y)$. There are thus obtained N pairs of amplitude terms $A_{m,i}$ and $B_{m,i}$. Each of these pairs of terms constitutes an information on a given column of the object.

The following table gives for each column of the object and each scan the frequency and amplitude (amplitude being defined by its cosine and sine parts). The frequencies in the table are space-frequencies; to obtain time-frequencies, it is sufficient to multiply them by the constant velocity of the scan.

| Scan Number | Column Number | | | | | | | |
|---|---|---|---|---|---|---|---|---|
| | 1 | | 2 | | i | | N | |
| | $a_{m,1}$ | $A_{m,1}$ and $B_{m,1}$ | $a_{m,2}$ | $A_{m,2}$ and $B_{m,2}$ | $a_{m,i}$ | $A_{m,i}$ and $B_{m,i}$ | $a_{m,N}$ | $A_{m,N}$ and $B_{m,N}$ |
| 1 | 0 | $A_{11}, B_{11}$ | $1/L$ | $A_{12}, B_{12}$ | $i/L$ | $A_{1i}, B_{1i}$ | $N/L$ | $A_{1N}, B_{1N}$ |
| 2 | $N/L$ | $A_{21}, B_{21}$ | 0 | $A_{22}, B_{22}$ | $\dfrac{i-1}{L}$ | $A_{2i}, B_{2i}$ | $\dfrac{N-1}{L}$ | $A_{2N}, B_{2N}$ |
| 3 | $\dfrac{N-1}{L}$ | $A_{31}, B_{31}$ | $N/L$ | $A_{32}, B_{32}$ | $\dfrac{i-2}{L}$ | $A_{3i}, B_{3i}$ | $\dfrac{N-2}{L}$ | $A_{3N}, B_{3N}$ |
| m | $\dfrac{N-m}{L}$ | $A_{m1}, B_{m1}$ | $\dfrac{N-m+1}{L}$ | $A_{m2}, B_{m2}$ | $\dfrac{i-m}{L}$ | $A_{mi}, B_{mi}$ | $\dfrac{N-m-1}{L}$ | $A_{mN}, B_{mN}$ |
| N | $1/L$ | $A_{N1}, B_{N1}$ | $2/L$ | $A_{N2}, B_{N2}$ | $\dfrac{i+1}{L}$ | $A_{Ni}, B_{Ni}$ | 0 | $A_{NN}, B_{NN}$ |

The series of values $A_{1i}, B_{1i}, A_{2i}, B_{2i}, A_{3i}, B_{3i}, \ldots A_{mi}, B_{mi} \ldots A_{Ni}, B_{Ni}$ form N pairs of coefficients of the cosine and sine terms in the expression of $b_i(y)$ and thereby $b_i(y)$ may be written $$b_i(y) = \sum_{m=1}^{m=N} C_{m,i} \cos(2a_{m,i}y + \phi_{m,i})$$

FIG. 18 shows the apparatus for deriving the Fourier transforms of the various columns from the signals of the above table.

The tape sections $71_1$ to $71_8$ on which are recorded the signals obtained in the first to eighth scans are cut-out and driven by individual and synchronized driving means to respectively pass in front of reading heads $72_1$ to $72_8$. The outputs of these heads are connected to the inputs $73_1$ to $73_8$ of a rotative switch 74. This switch advances one step after each scan of the tapes. The outputs $75_1$ to $75_8$ of switch 74 are respectively connected to a low-pass filter $76_0$ and seven pass-band filters $76_1$ to $76_7$ tuned on time-frequencies 0, $v/L$ to $7v/L$ corresponding to space-frequencies 0, $1/L$ to $7/L$. The outputs of filters $76_0$ to $76_7$ are connected together in parallel to an output terminal 77. At this terminal respectively appear during the first to eighth scans the Fourier transforms of the first to eighth columns. Instead of dividing the tape into eight portions, it is also possible to loop it and to equally distribute around it eight reading heads.

Figure 2:
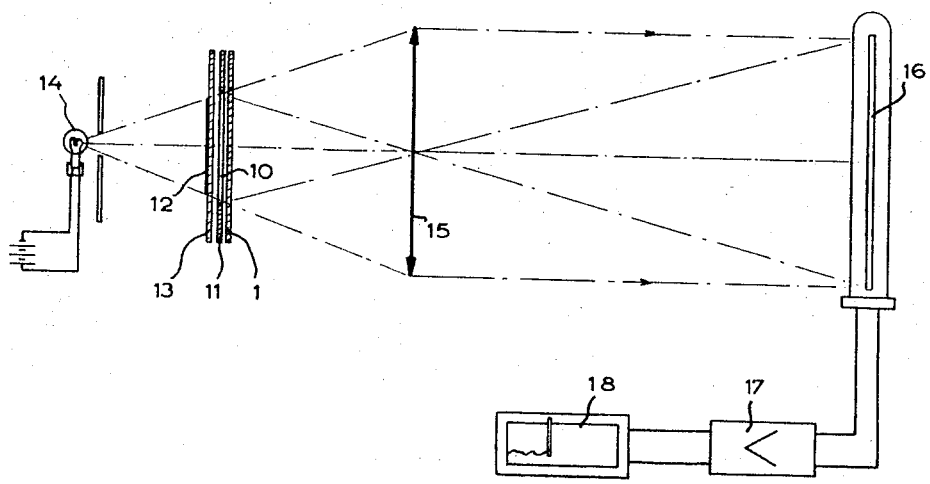

Referring now to FIG. 2, 13 is a transparent image-carrier or support on the surface of which is stored an image 12 (the transparency of this image is the function $B(xy)$ above referred to), 11 is a mask with a slit 10 in it and 1 is the pattern grid; these elements are superimposed in the order support, mask, grid. A light source 14 located at the focus of objective 15 projects image 12 onto photocell 16 through slit 10 and grid 1. The output terminals of photocell 16 are connected to an amplifier 17 which controls registering means 18. These registering means 18 records the function $F(t)$ given by Formula (5).

Figure 3A:
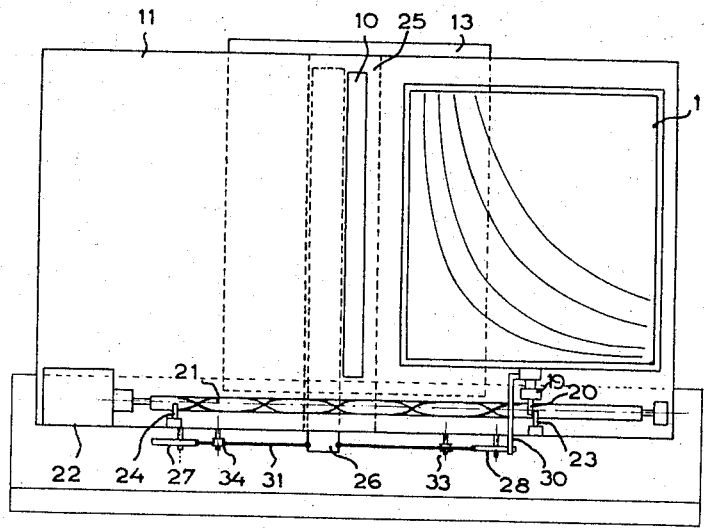
Figure 3B:
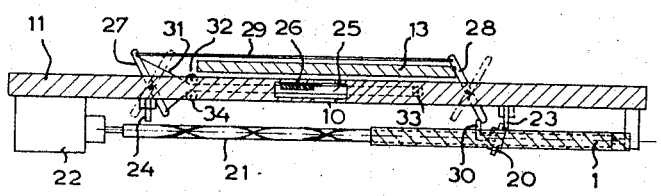
Figure 3C:
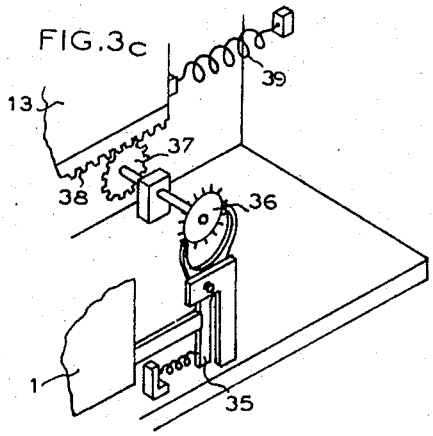

The means for shifting the image-carrier and the grid with respect to the mask are shown in FIGS. 3a to 3c.

Grid 1 is secured to bracket 19 which carries a pin 20 adapted to follow the threads of screw 21 having two threads of opposite directions. This screw 21 rotates within two bearings secured to mask 11 and it is continuously driven by motor 22 also secured to mask 11. At the ends of its path, bracket 19 and the shank of pin 20 are brought in abutment against stop members 23 and 24 and the pin and the stop members cooperate with each other to rotate the pin around its longitudinal axis. The end of the pin that is engaged with the threads of one direction, the sinistrorsal ones for example, of screw 21 turns around and becomes engaged with the dextrorsal threads; thus the direction of the grid movement with respect to the mask is reversed. Preferentially, the pitch of the sinistrorsal threads which correspond to the forward movement is larger than the pitch of the dextrorsal threads which correspond to the backward movement; thus for each reciprocation movement the forward course is faster than the backward course.

Mask 11 comprises an inner hole 25 in which a shutter plate 26 can move to mask and unmask slit 10. The position of the shutter plate with respect to the slit is controlled by two levers 27 and 28 connected by a rod 29; these levers are rotatively secured to mask 11 at the two ends of the course of grid 1. The frame of the grid carries a projecting pin 30 which co-operates with the lower portion of the levers and allow the same to tilt up at each end of the course of the grid.

To the two ends of lever 27, are fastened the two ends of a metal string 31 which is guided by three pulleys 32, 33, 34 mounted on mask 11 and secured to the shutter plate 26. It is easy to see that, when levers 27 and 28 are brought from the position shown in continuous line in FIG. 3b and corresponding to the forward course to the position shown in dotted line and corresponding to the backward course of the grid, the shutter plate 26 is switched over from the non-shut to the shut state.

Each time the grid 1 is reset (FIG. 3c) it controls lever 35 which drives the escapement device 36. This escapement drives pinion 37 which is rotatively mounted on mask 11 and engaged with rack 38 secured to the object-support 13. Support 13 is biased by a spring 39 secured thereto and at its other end to the base of the apparatus.

The movement of members 11, 26 and 1 is thus exactly that explained in the foregoing. Motor 22 being energized, the grid undergoes a succession of identical reciprocation movements, the forward movement being faster than the backward movement. Each time pin 30 actuates levers 37 and 35, the shutter plate 26 unmasks slit 10 and escapement 36 allows support 13 to advance one step with respect to mask 11.

Figure 4:
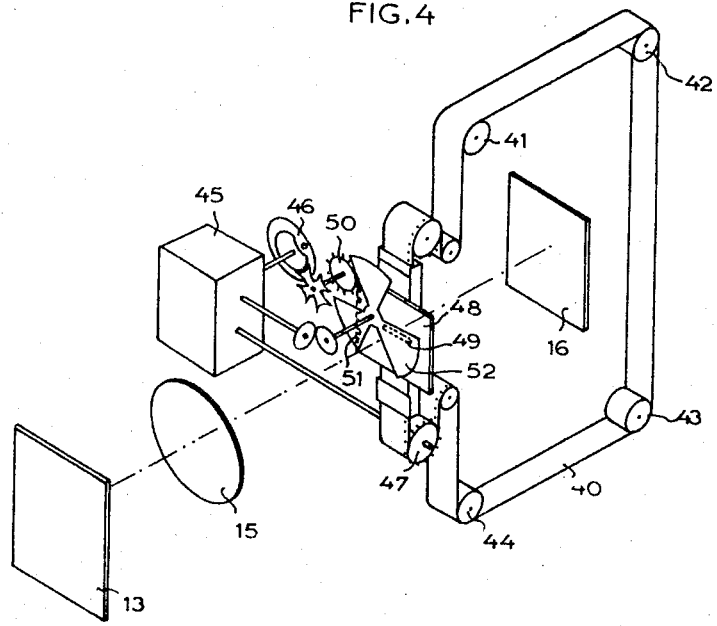

FIG. 4 represents another analyzer device proceeding according to one-dimensional analysis.

It comprises an object-support 13 which may be of any kind known in the prior art, for example the screen of a cathode ray tube or a frame in which diapositives can be inserted or a frosted glass plate onto which images can be focused through an objective. The object is projected by objective 15 onto photocell 16 through film 40, forming an image in the plane of the film. The film is looped; it passes on spools 41–44 and is continuously driven by motor 45 and driving wheel 47. In front of the film a plate 48 with a horizontal slit 49 in it may be shifted step-by-step, the motion of the plate being controlled by a Maltese cross system 46 and a rack and pinion system 50–51. Finally a rotative shutter 52 is driven by motor 45. This shutter, which is not essential but optional, shuts slit 49 when plate 48 which carries the slit advances one step. For this purpose, the axis of shutter 52 and the axis of the driving drum of the Maltese cross 46 are suitably synchronized as it is well known in motion-picture technique.

Figure 6:
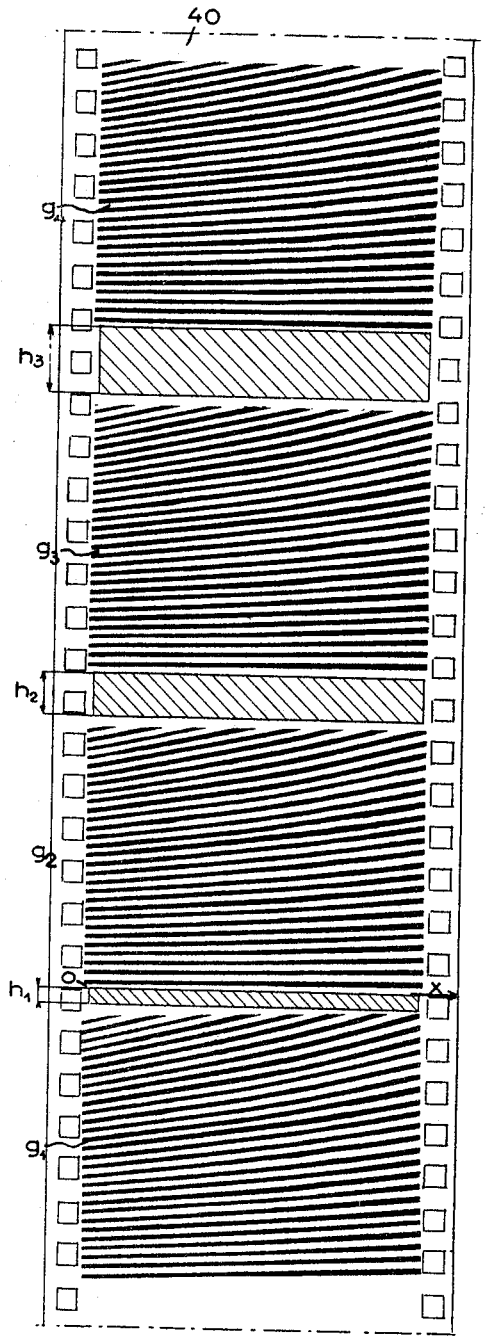
FIG. 6 represents a multiple pattern grid film cooperating with the object analyzer proceeding by unidimensional scanning of FIG. 4.

Film 40 is shown in FIG. 6. It comprises a plurality of pattern views $g_1$ to $g_4$ (of course, there are much more than four views in the film) the pattern being that of the grid of FIG. 1c, the x-axis being horizontal and perpendicular to the direction of motion of the film. In order that the asymptote Ox be at the beginning of each scan coincident with slit 49 and regarding the fact that said slit advances one step between two adjacent views of the pattern, the spacing between two successive views increases by steps along the film. In FIG. 6, there are shown hatched spacing portions (opaque on the film) of respective heights $h_1, h_2, h_3, \ldots h_n$ between the pattern views $g_1, g_2, g_3, \ldots g_n$ such that $$h_2 = h_1 + \Delta h$$
$$h_3 = h_1 + 2\Delta h$$
$$h_n = h_1 + n\Delta h$$

where $\Delta h$ is the amount by which plate 48 is displaced between two successive projections. These opaque spacings cut the light off from the object line when the views are allowed to succeed one another and make shutter 52 superfluous.

FIG. 7 represents an analyzer device proceeding by two-dimensional scanning.

The device is identical with that of FIG. 4 except that plate 48 and its step-by-step driving system are omitted and that film 50 has a pattern different from film 40. Film 50 is represented in FIG. 8. Each view of the film comprises the four juxtaposed grids of FIG. 5 but in each view the separation line Oy is transversally spaced by a specific distance from the edge of the film; from one view to the subsequent one the transversal spacing is L/N (of course the spacing amount is much smaller than shown in FIG. 8). The various axes parallel to the x-direction have been drawn in FIG. 8. If it is assumed that the reeling off direction of the film is from the bottom to the top of the figure, at each scan the pattern portion above one $x$-axis is replaced by the pattern portion below said axis. A second scan must only begin when the pattern portion above the subsequent $x$-axis has replaced the pattern portion below the preceding $Ox$ axis which covers the object at the end of the first scan. It results that the views of the fourfold pattern grid can be juxtaposed without any spacing, the shutter 52 being alternately shut and open equal times, namely during the shift-time of a half view (it is open during the time the portion of a view below the $x$-axis replaces the portion above and shut during the time the portion of a view above the $x$-axis replaces the portion below). In FIG. 8, the object is comprised between lines 61, 62, 63, 64; the parts of the film projecting beyond the limit lines 63 and 64 and which have been drawn in an explanation purpose are in fact omitted.

In order to make the explanations easier, it has been assumed in the case of one-dimensional analysis that the grid was operative during its forward course and unoperative during its faster backward course and that the stepped advance occurred during the backward course. It would also be possible to render operative both the forward and backward courses and to give them equal velocities and to keep short idle time intervals at the end of each course to advance the slit one step.

It was also assumed in FIG. 8 that each scanning cycle comprised an operative period during which the portion above a $x$-axis of the fourfold grid was replaced by the portion below said axis and an unoperative period during which the portion below a $x$-axis of the fourfold grid was replaced by the portion above the adjacent $x$-axis and that these two periods were equal. Of course the unoperative period can be made much more shorter than the operative period.

It was assumed up to now that the movement of the pattern grid was a rectilinear uniform movement. It will now be explained how the pattern of the grid must be altered the cases of a sine alternative movement (sine reciprocation) and a circular uniform movement.

The principle of the invention process is to allow a light or radiation flux from an object, more precisely and for an easier explanation, from a line of the object coinciding with a slit in a mask, to pass through a movable grid whose transparency follows a given space law, not necessarily a sine law, this space law being transformed into a sine time law by the movement of the grid. Referring to FIG. 9 which relates to the case of FIGS. 1c and 1d, i.e. to the case of a sine space law and of a linear movement, let us assume that at time $t_1$ the slit is set along the line of ordinate $y_1$ and that at this ordinate the space-frequency of the grid is $\sigma_1$. Since the grid moves linearly with a velocity $v$ in the direction of the $y$-axis, the slit will have an ordinate $2y_1$ at time $2t_1$ and an ordinate $ny_1$ at time $nt_1$ and further the space frequency will be related to the time-frequency by the relationship $\nu=v\sigma$.

Consequently the space-frequency must be $2\sigma_1$ at ordinate $2y_1$ and $n\sigma_1$ at ordinate $ny_1$. The transparency pattern is thus represented by a sinusoid 101 at ordinate $y_1$, a sinusoid 102 at ordinate $y_2$, a sinusoid 103 at ordinate $y_3$ and so on, each sinusoid having a period half that of the preceding. The locus formed by the zeroes of the same order of these sinusoids is an equilateral hyperbola.

If now the ordinates corresponding to equally distributed times are not equally distributed in space, the relationship relating the ordinate to time being no longer linear, it is necessary, to allow the space-frequency to vary linearly with time, that it varies with respect to the ordinate according to the law relating the ordinate to time, i.e. to the kinematic law of the movement.

In FIG. 10, it is assumed that grid 1' is moved with respect to the object-support 13 according to a sine rectilinear movement. The grid is guided by slide-bar 53 and is driven by a crank 54 and a crank-arm 55. The movement of grid 1' is given by equation $$y = q \sin 2\pi \frac{t}{T}$$

The abscissa $x$ of point B of FIG. 11 must be such that its reciprocal $x^{-1}$ be proportional to time therefore to $\sin^{-1}(y/q)$ or, in other words, $y$ must be proportional to $\sin(1/x)$ and therefore given by $$y = q \sin 2\pi p/x \qquad (10)$$

where $p$ is a parameter.

The curve defined by Equation 10 is shown in FIG. 11. It intersects the $x$-axis at points of abscissae $2p$, $2p/2$, $2p/3$, $2p/4$, ... it is tangent to the straight line $y=q$ at points of abscissae $4p$, $4p/5$, $4p/9$, $4p/13$, ... and to the straight line $y=-q$ at points of abscissas $4p/3$, $4p/7$, $4p/11$, $4p/15$, ... It will be sufficient to consider only one branch of the curve comprised between the ordinates $y=\pm q$, for example the branch CBD (if one needs the zero space-frequency, the branch to be chosen is the branch CG).

Equation 10 thus defines a family of partial curves CBD, C'B'D', C''B''D'' delimiting between one another regions which are alternately transparent and opaque. The spacings between adjacent branches are respectively equal to $2p$ along the $x$-axis, to $4p$ along the ordinate line $y=q$ and to $4p/3$ along the ordinate line $y=-q$. The space-frequency is therefore $3/4p$ along the line $y=-q$, $2/4p$ along the line $y=0$ and $1/4p$ along the line $y=q$. It is easy to check that at any time $t$ (the time origin is assumed to be the instant at which the slit unmasks the line $y=q$) the space-frequency is proportional to $t$. For example, for $t=3T/4$, namely at the time when the slit falls in with the straight line F of FIG. 12, the ordinate takes the value $y=q/\sqrt{2}$ and the space-frequency the value $\sigma=3/8p$ which is the mean value of $\sigma=1/4p$ for $y=q$ and $\sigma=2/4p$ for $y=0$.

In FIG. 13, the grid 1'' is driven with respect to the object-support according to a circular uniform movement. If one writes that the space-frequency $\sigma=\rho^{-1}$ ($\rho$ polar radius of the first zero of the radial sinusoid) is proportional to the polar angle $\theta$, one obtains the family of curves defined in polar coordinates by the equation:

$$\rho = 2p\pi r/\theta \qquad (11)$$

where $p$ is an integral parameter and $r$ the value of $\rho$ for $\theta=2\pi$ and $p=1$. The curves constitute a family of hyperbolic spirals with respect to a center point which divide each radius and each circle centered at said point into equal segments.

The hyperbolic spirals define between one another regions which are alternately transparent and opaque. A sectoral portion 105 of grid 1'' is left opaque and the object-support 13 advances one step during the time-interval this sector travels in front of slit 10. The step-by-step advance device is not shown in FIG. 13 since it merely derives from that of FIG. 4 by omitting film 40 and the driving means for the same and by replacing shutter 52 by grid 1''.

Referring now to FIG. 16, there is shown an object comprising only a luminous point $\alpha$ on a black background. This point is at the crossing of the line of order $j$ and of the column of order $i$. The table of FIG. 17 shows the waveform of the output signals of the apparatus of the invention in two hypotheses, being assumed that the number of analyzed points per line and column is N and that the analyzing time is $Nt_1$ in all cases. In other words the resolution of the object is $N^2$.

In the first column of the table, the analysis is a conventional scanning process of the type used in the television art, that is a spot is scanning the successive columns of the object. During the scanning of the column of order $i$, a pulse of duration $t_1/N$ is received.

In the first hypothesis, the analysis is a one-dimensional Fourier transform analysis, the slit being successively superimposed to the lines of the object. When the slit is superimposed to the line of order $j$, a sine signal of duration $t_1$ whose frequency is characteristic of the position of point $\alpha$ along the line, i.e. of the abscissa of point $\alpha$, is received.

In the second hypothesis, the analysis is a two-dimensional Fourier transform analysis. At each scan, there is obtained a signal of duration $t_1$ whose frequency is characteristic of the abscissa of point $\alpha$, not measured from the edge of the object parallel to the scanning direction but measured from the asymptote $Oy$ of the grid. For that of the scans in which the asymptote $Oy$ falls in with the point $\alpha$, there is obtained a constant signal. All the sine signals and constant signal have the same duration $t_1$. They have the same amplitude and are cophasal for a given position of the grid in each scan, this given position being characteristic of the ordinate of point $\alpha$. There is shown in FIG. 17 the signal resulting of the combination of the constant and sine signal components. This resulting signal has the same time-position as the pulse of the first column of the table of FIG. 17.

Taking as unit the signal-to-noise ratio in the case of conventional scanning, the signal-to-noise ratio is $\sqrt{N}$ in the case of one-dimensional Fourier transform analysis and N in the case of two-dimensional Fourier transform analysis.

What I claim is:

1. A Fourier transform object analyzer comprising in combination a support for a plane object to be analyzed, a plane pattern grid located in a plane parallel to that of said object and including alternate transparent and opaque regions, said regions being bounded by branches of a family of curves defined by the Cartesian equation:

$$y = q \sin 2\pi p/x$$

where $p$ is a parameter, $q$ a constant length and $x$ and $y$ the abscissa and ordinate of a point of a curve branch reckoned from rectangular $x$- and $y$-axes, each such curve branch being defined by giving to the argument $2\pi p/x$ a different one of a series of successive values differing from each other by $\pi$, first means for imparting said pattern grid reciprocation motions sinusoidal with respect to time in front of and with respect to said object-support along said $y$-axis, second means for step-by-step shifting said plattern grid in front of and with respect to said object-support along said $x$-axis, each stepped shift succeeding each reciprocation motion, and photosensitive means for collecting the light rays issued from said object through said pattern grid during each reciprocation motion of said pattern grid.

2. A Fourier transform object analyzer comprising in combination a support for a plane object to be analyzed, a mask located in a plane parallel to that of said object and provided with an elongated rectilinear slit allowing light rays from a line of the object to be projected therethrough, means for shifting said mask step-by-step in a given direction substantially perpendicular to the length of said slit for sequentially unmasking the object lines, a plane pattern grid located in a plane parallel to above-said plane and including contiguous transparent and opaque regions, said regions being defined by curves equally spaced apart along straight lines substantially perpendicular to said given direction, the spacing between the curves along said straight lines varying inversely proportionally to the distance of these straight lines from an origin straight line perpendicular to said given direction, means for imparting to said pattern grid a second continuous translation constant velocity movement with respect to the object-support along said given direction, and photosensitive means for collecting the light rays issued from the object across said pattern grid and slit for each position thereof.

3. A Fourier transform object analyzer comprising in combination a support for a plane object to be analyzed, a mask located in a plane parallel to that of said object and provided with an elongated rectilinear slit allowing light rays from a line of the object to be projected therethrough, means for shifting said mask step-by-step in a given direction substantially perpendicular to the length of said slit for sequentially unmasking the object lines through said slit, a plane pattern grid located in a plane parallel to above-said plane and including alternate transparent and opaque regions, said regions being bounded by equilateral hyperbolae equally spaced apart along straight lines parallel to said given direction and along straight lines parallel to a second direction perpendicular to said given direction, the spacing between the equilateral hyperbolae along said straight lines parallel and perpendicular to said given direction respectively varying inversely proportionally to the distance of these straight lines from a first and a second given reference straight line, means for imparting to said pattern grid a second continuous translation constant velocity movement with respect to the object-support along said given direction, and photosensitive means for collecting the light rays issued from said object across said pattern grid and slit for each position thereof.

4. A Fourier transform object analyzer comprising in combination a support for a plane object to be analyzed, a mask located in a plane parallel to that of said object and provided with an elongated rectilinear slit allowing light rays from a line of the object to be projected therethrough, means for shifting said mask step-by-step in a given direction substantially perpendicular to the length of said slit for sequentially unmasking the object lines through said slit, a plane pattern grid located in a plane parallel to above-said plane and including alternate transparent and opaque regions, said regions being bounded by equilateral hyperbolae defined by the Cartesian equation:

$$xy = 2nD^2$$

where $n$ is a parameter, D a constant length and $x$ and $y$ the abscissa and ordinate of a point of a hyperbola reckoned from a $x$-axis and a $y$-axis respectively perpendicular and parallel to said given direction, means for imparting to said pattern grid a second continuous translation constant velocity movement with respect to the object-support along the $y$-axis, and photosensitive means for collecting the light rays issued from the object across said pattern grid and slit for each position thereof.

5. A Fourier transform object analyzer comprising in combination a support for a plane object to be analyzed, a mask located in a plane parallel to that of said object and provided with an elongated rectilinear slit allowing light rays from a line of the object to be projected therethrough, means for shifting said mask step-by-step in a given direction substantially perpendicular to the length of said slit for sequentially unmasking the object lines through said slit, a plane pattern grid located in a plane parallel to the above-said plane and including alternate transparent and opaque regions, said regions being bounded by equilateral hyperbolae defined by the Cartesian equation:

$$xy = (2n-1)D^2$$

where $n$ is a parameter, D a constant length and $x$ and $y$ the abscissa and ordinate of a point of a hyperbola reckoned from a $x$-axis and a $y$-axis respectively perpendicular and parallel to said given direction, means for imparting to said pattern grid a second continuous translation constant velocity movement with respect to the object-support along the $y$-axis, and photosensitive means for collecting the light rays issued from the object across said pattern grid and slit for each position thereof.

6. A Fourier transform object analyzer comprising in combination a support for a plane object to be analyzed, a mask located in a plane parallel to that of said object and provided with an elongated rectilinear slit allowing light rays from a line of the object to be projected therethrough, means for shifting said mask step-by-step in a given direction substantially perpendicular to the length of said slit for sequentially unmasking the object lines through said slit, a plane pattern grid located in a plane parallel to above-said plane and including alternate transparent and opaque regions, said regions being bounded by branches of a family of curves defined by the Cartesian equation:

$$y = q \sin 2\pi p/x$$

where $p$ is a parameter and $q$ a constant and $x$ and $y$ the abscissa and ordinate of a point of a curve branch reckoned from an $x$-axis perpendicular to said given direction and a $y$-axis parallel to same said given direction, each such curve branch being determined by giving the argument $2\pi p/x$ a different one of a series of successive values differing from each other by $\pi$, means for reciprocating sinusoidally with respect to time said pattern grid with respect to the object-support along the $y$-axis, and photosensitive means for collecting the light rays issued from the object through said pattern grid and slit for each position thereof.

7. A Fourier transform object analyzer comprising in combination a support for a plane object to be analyzed, a mask located in a plane parallel to that of said object and provided with an elongated rectilinear slit allowing the light rays from a line of the object to be projected therethrough, means for shifting said mask step-by-step in a given direction substantially perpendicular to the length of said slot for sequentially unmasking the object lines through said slit, a film comprising a plurality of lengthwise arranged views, each view consisting of a pattern including alternate transparent and opaque regions, said regions being bounded by a family of equilateral hyperbolae defined by the Cartesian equation:

$$xy = 2nD^2$$

where $n$ is a parameter, $D$ a constant length and $x$ and $y$ the abscissa and ordinate of a point of a hyperbola reckoned from an $x$-axis transverse to the length of said film view and a $y$-axis in the direction of the film length, each view of a given order being spaced apart along the film from the next view by an opaque spacing region equal to this order multiplied by the step undergone by the slit at each shift, whereby the between view spacing increases from the first view of the film to the last, means for uniformly driving the film perpendicularly to the slit, synchronizing means between the shifting means for the mask and the driving means for the film, objective means for projecting the object onto said film, and photosensitive means for collecting the light rays issued from said object through said objective means, slit and film.

8. A Fourier transform object analyzer comprising in combination a support for a plane object to be analyzed, a plane pattern grid including alternate transparent and opaque regions, said regions being bounded by curves equally spaced apart along straight lines perpendicular to a given direction, the spacing between the curves along said straight lines varying inversely proportionally to the distance of each such straight line from an origin point, first means for imparting to said pattern grid a series of continuous motions along a direction perpendicular to said given direction, second means for step-by-step shifting said pattern grid with respect to said object-support along a direction parallel to said given direction, each stepped shift succeeding each continuous motion, and photosensitive means for collecting the light rays issued from said object through said pattern grid for each continuous motion of said pattern grid.

References Cited by the Examiner

UNITED STATES PATENTS 2,997,699 8/1961 Lovell _____ 250—233
3,173,019 3/1965 Wormser _____ 250—203

RALPH G. NILSON, *Primary Examiner.*

J. D. WALL, *Assistant Examiner.*